United States Patent
Kimisawa et al.

(10) Patent No.: US 7,329,339 B2
(45) Date of Patent: Feb. 12, 2008

(54) STRAINER DEVICE FOR FUEL TANK

(75) Inventors: Toshihide Kimisawa, Yokohama (JP);
Takashi Iwamoto, Machida (JP);
Masaki Ueno, Wako (JP); Osamu Suzuki, Wako (JP)

(73) Assignees: NIFCO Inc., Yokohama, Kanagawa (JP); Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 10/902,841

(22) Filed: Aug. 2, 2004

(65) Prior Publication Data
US 2005/0029173 A1  Feb. 10, 2005

(30) Foreign Application Priority Data
Aug. 8, 2003 (JP) ............... 2003-289596

(51) Int. Cl.
*B01D 35/28* (2006.01)

(52) U.S. Cl. ............ 210/136; 210/456; 210/459

(58) Field of Classification Search ........... 210/172, 210/416.4, 409, 460, 406, 483
See application file for complete search history.

(56) References Cited

U.S. PATENT DOCUMENTS

| 1,113,683 | A | * | 10/1914 | Pfahler ............ 210/313 |
| 1,191,741 | A | * | 7/1916 | Scull ............ 210/172 |
| 2,281,053 | A | * | 4/1942 | Seney et al. ........ 137/565.15 |
| 2,628,741 | A | * | 2/1953 | Wilds ............ 220/86.1 |
| 2,933,188 | A | * | 4/1960 | Jacula ............ 210/172 |
| 4,853,125 | A | * | 8/1989 | Hanabusa ............ 210/172 |
| 5,055,187 | A | * | 10/1991 | Ito et al. ............ 210/172 |
| 5,924,445 | A | * | 7/1999 | Ambrose et al. ........ 137/549 |
| 6,464,872 | B1 | * | 10/2002 | Honda ............ 210/416.4 |
| 6,971,405 | B2 | * | 12/2005 | Pickelman ............ 137/540 |

FOREIGN PATENT DOCUMENTS

| JP | 53-154916 | 12/1978 |
| JP | 63-13931 | 4/1988 |

\* cited by examiner

*Primary Examiner*—Krishnan Menon
*Assistant Examiner*—Benjamin Kurtz
(74) *Attorney, Agent, or Firm*—Manabu Kanesaka

(57) ABSTRACT

A strainer device for a fuel tank includes a sucking passage member provided with a passage opened in the fuel tank; a filtering member attached to the sucking passage member for covering a hole of the passage; and a conduit connecting portion extending outside the fuel tank for connecting a conduit for guiding fuel passing through the filtering member. The conduit connecting member is attached to the sucking passage member, so that a concave portion is formed at a connecting portion for receiving a check valve for preventing the fuel from flowing back from outside of the fuel tank.

4 Claims, 2 Drawing Sheets

STRAINER DEVICE FOR FUEL TANK

BACKGROUND OF THE INVENTION AND RELATED ART STATEMENT

The invention relates to a strainer device to be attached to a fuel tank and, more specifically, to a strainer device suitable for a fuel tank of an automobile and motorcycle.

A strainer is attached to a fuel tank for removing dust and impurity in fuel, and has been known to have a structure in which a connecting port of a conduit is formed in a bottom wall of a fuel tank for guiding fuel to a combustion device such as an engine, and a strainer is inserted into the fuel tank through the connecting port (refer to Japanese Utility Model Publication (Kokai) No. 53-154916).

In a case of a moving vehicle such as an automobile and motorcycle, when a car body is inclined upon turning a curve, since a liquid level in the fuel tank changes, it is necessary to provide a check valve for preventing filtrated fuel from flowing back into the fuel tank from the conduit side. Conventionally, such a check valve is provided at an appropriate place of a fuel supplying passage between the fuel tank and the engine. In other words, it is necessary to provide the check valve in the fuel supplying passage as an independent device. Accordingly, in manufacturing, it is necessary to have a step of supplying a part or attaching the check valve, thereby making it difficult to simplify part management and reduce man hour.

In view of the problems described above, an object of the present invention is to provide a strainer device to be attached to a fuel tank wherein the number of parts and manufacturing man hour can be reduced.

Further objects and advantages of the invention will be apparent from the following description of the invention.

SUMMARY OF THE INVENTION

In order to attain the objects described above, according to the present invention, a strainer device to be attached to a fuel tank includes a sucking passage member having a passage hole opened in a fuel tank; a filtering member formed of one or a combination of a molded mesh, woven mesh and non-woven cloth and attached to the sucking passage member for covering an opening of the passage hole; and a conduit connecting portion extending outside the fuel tank for connecting a conduit to guide fuel passing through the filtering member. The sucking passage member and the conduit connecting member are connected such that a concave portion is formed at a connecting portion between the sucking passage member and the conduit connecting member for receiving a valve to prevent fuel from flowing back from outside the fuel tank.

In the present invention, the sucking passage member and the conduit connecting member are connected such that the concave portion is formed at the connecting portion between the sucking passage member and the conduit connecting member for receiving the check valve to prevent fuel from flowing back from outside the fuel tank. Accordingly, it is possible to integrally provide the check valve at an attaching portion of the strainer device relative to the fuel tank. Therefore, according to the present invention, it is possible to simplify the structure of the strainer device, thereby reducing the number of parts and production cost.

DETAILED DESCRIPTION OF PREFERRED EMBODIMENT

Figure 1:
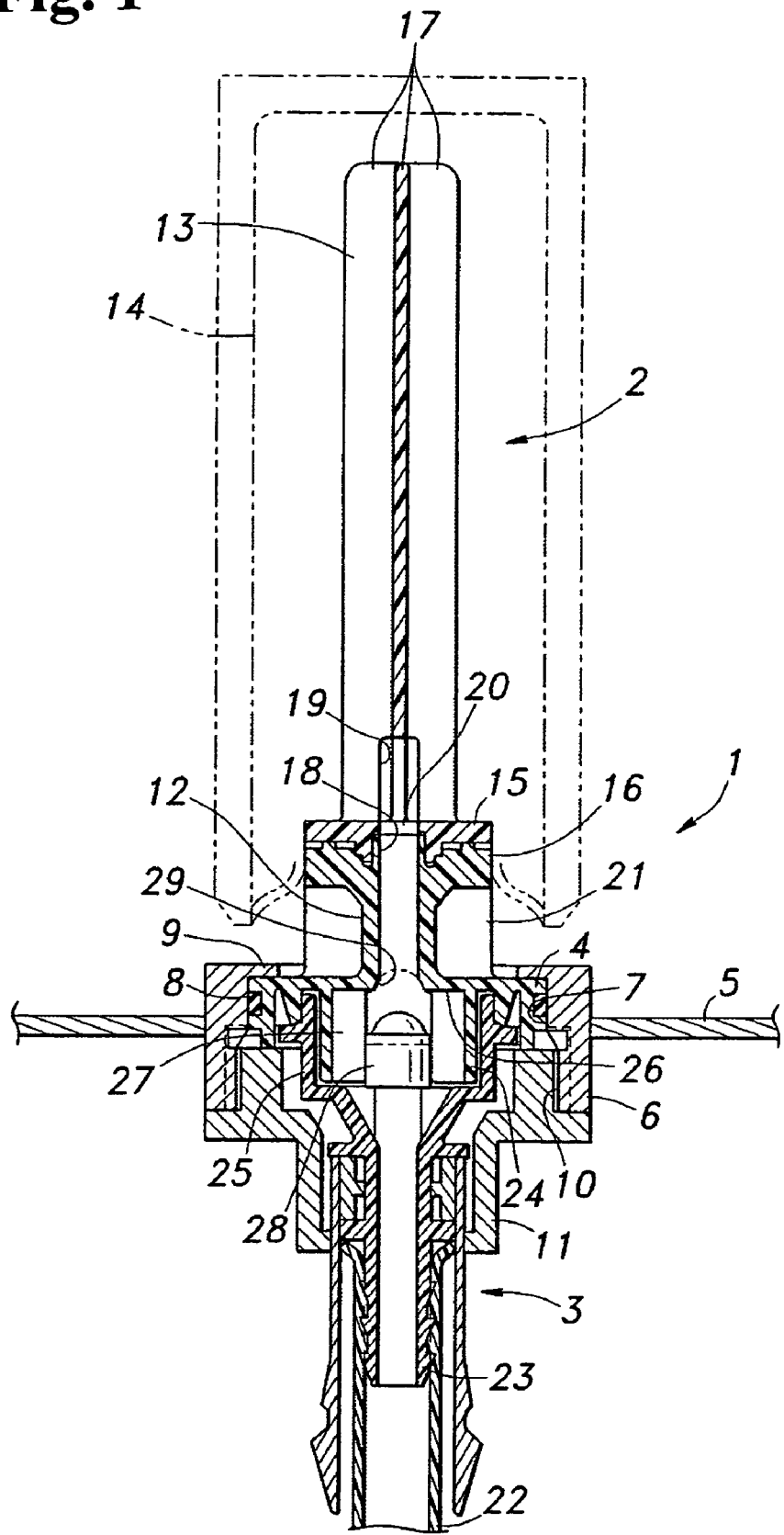
FIG. 1 is a vertical sectional view showing a strainer device according to an embodiment of the present invention.

Hereunder, embodiments of the present invention will be explained with reference to the accompanying drawings in detail. FIG. 1 shows a strainer device according to an embodiment of the present invention. A strainer device 1 is mainly formed of a tank inner portion 2 and a tank outer portion 3, and the whole device is made of a synthetic resin.

A base end portion 4 of the tank inner portion 2 is inserted from an outer side of a tank 5 to a reduced diameter portion 7 of a socket member 6 fixed to a bottom wall of the fuel tank 5 by welding or the like in a state that the base end portion 4 is liquid-tightly sealed by an O ring 8. The base end portion 4 is positioned by abutting against an inward flange 9 formed at an inner end of the tank of the socket member 6. Also, the base end portion 4 of the tank inner portion 3 is held between the inward flange 9 of the socket member 6 and the end surface of the plug member 11 by screwing a plug member 11 with respect to a female screw 10 of the socket member 6. Accordingly, the strainer device is fixed to the bottom wall of the fuel tank 5.

The tank inner portion 2 is formed of a sucking passage member 12, a strainer holding member 13 and a filtering member 14. The sucking passage member 12 and the strainer holding member 13 are provided with outward flanges 15 and 16, respectively. The filtering member 14 is formed in a rectangular bag shape. The strainer holding member 13 is covered by the filtering member 14 formed in a bag shape and an opening end of the filtering member 14 is held between the flanges 15 and 16 and welded together, so that the sucking passage member 12, the strainer holding member 13 and the filtering member 14 are integrated.

Figure 2:
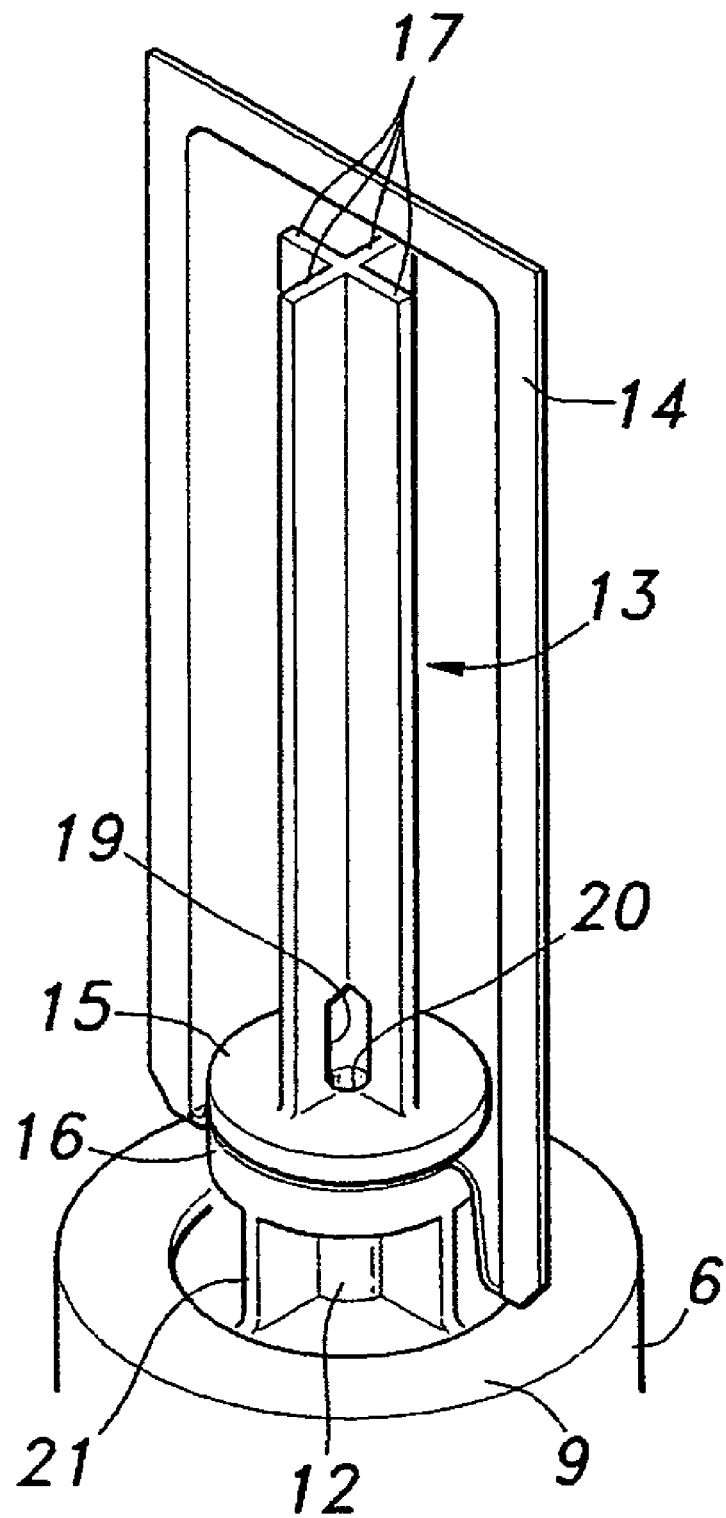
FIG. 2 is a perspective view showing a portion of the strainer device to be disposed in a fuel tank according to the embodiment of the present invention, wherein a filtering member is partially removed.

As shown in FIG. 2, the strainer holding member 13 is structured such that four elongated plate shape members 17 extending in a direction perpendicular to the outward flange 15 are crossed on a central axis of the outward flange 15 to have a cross shape section. The sucking passage member 12 is provided with a passage hole 18 coaxial with the central axis of the outward flange 15 and extending from a base of the strainer holding member 13 to the base end portion 4 inserted into the socket member 6. A cut-off portion 19 is formed in each of the plate shape members 17 at a mutually connected portion thereof, so that an opening 20 communicating with the passage hole 18 is opened at the connected portions of the plate shape members 17 forming the strainer holding member 13 relative to the outward flange 15. Further, reinforcing ribs 21 with a regular interval in the circumferential direction are formed between the outward flange 16 and the base end portion 4 of the sucking passage member 12.

The filtering member 14 is formed in a bag shape by welding an outer periphery thereof, and has a double-layer structure in which a woven fabric in a plain shape, twill shape, or matt shape made of a synthetic resin is laminated with a non-woven fabric made of a synthetic resin. The filtering member 14 is spot-welded with a suitable pitch so that the layers of the filtering member 14 are not separated from each other. The strainer holding member 13 is covered with the filtering member 14. The strainer holding member 13 is submerged in fuel, for example, gasoline, through the bottom wall of the fuel tank 5. Accordingly, the strainer holding member 13 with high rigidity due to the cross shape section maintains the filtering member 14 in an expanded shape in gasoline.

As described above, the filtering member 14 has a sufficiently large contacting area with gasoline so that gasoline passes through the filtering member 14 with minimum resistance, thereby improving efficiency of trapping impurities. The four plate shape members 17 constituting the strainer holding member 13 are disposed in the filtering member 14 with an equal angle in between, and extend in parallel to an axis line of the passage hole 18. The communicating hole 20 connected to the passage hole 18 is opened between the plate shape members 17. Accordingly, the plate shape members 17 function as a rectifier, so that gasoline flows smoothly through the passage hole 18.

Incidentally, the filtering member 14 is not limited to the double-layer structure formed of a woven cloth and non-woven cloth. In order to maintain a shape, the filtering member 14 may be formed of a combination of basket shape members (not shown) where a mesh is formed with injection molding, or may be formed of just one of a woven cloth, non-woven cloth, basket shape member and a combination thereof. Especially, when the filtering member 14 is formed of a soft and flexible material as described above, even if the inward flange 9 provided to the socket 6 has a small inner diameter, it is easy to insert the filtering member 14 into the tank.

In the embodiment, the opening end of the filtering member 14 is sandwiched and welded between the sucking passage member 12 and the strainer holding member 13. Alternatively, a sheet-shape filtering member may be inserted between the sucking passage member 12 and the strainer holding member 13 and integrally molded together. Then, the sheet-shape filtering member is folded from the connecting portion between the sucking passage member 12 and the strainer holding member 13 to wrap around the strainer holding member 13; and overlapped peripheral portions of the filtering member are welded to form a bag shape.

The tank outer portion 3 is provided with a hose port 23 for inserting a conduit such as, for example, a rubber tube 22, for guiding gasoline to an engine. The tank inner portion 2 and the tank outer portion 3 are provided with cylindrical portions 24 and 25 with different diameters as connecting surfaces thereof respectively, so that the tank outer portion 3 surrounds the tank inner portion 2 from outside. The tank inner portion 2 and the tank outer portion 3 are then welded together to form an assembled part.

A plurality of radial shape ribs 27 is formed in the concave portion 26 provided inside the cylindrical portion 24 of the tank inner portion 2. A poppet valve 28 is retained in the concave portion 26 and is supported by inner end edges of the radial shape ribs 27 to be vertically slidable. The poppet valve 28 is made of a synthetic resin having specific gravity larger than that of gasoline, so that the poppet valve 28 normally is located under the concave portion 26 as a valve member. Accordingly, the poppet valve 28 does not block gasoline from flowing from the passage hole 18 to the rubber tube 22 through a space between the peripheries of the radial-shape ribs 27. When gasoline flows reversely from the rubber tube 22 inserted into the hose port 23, the poppet valve 28 floats with a flowing pressure to abut against the valve seat 29 formed on the exit opening of the passage hole 18, so that the passage hole 18 is closed and gasoline is prevented from reversely flowing into the fuel tank 5.

In the strainer device for a fuel tank according to the present invention, it is possible to reduce the number of parts and manufacturing processes. Accordingly, the strainer device is useful for a fuel tank of a moving vehicle such as an automobile and motorcycle.

The disclosure of Japanese Patent Application No. 2003-289596 is incorporated in the application.

While the invention has been explained with reference to the specific embodiment of the invention, the explanation is illustrative and the invention is limited only by the appended claims.

What is claimed is:

1. A strainer device to be attached to a fuel tank, comprising:
   a sucking passage member having a passage with a hole opened in the fuel tank at one end, and a first cylindrical portion at the other end thereof,
   a filtering member attached to the sucking passage member for covering the hole of the passage, and
   a conduit connecting member attached to the sucking passage member to extend outside the fuel tank for connecting a conduit to guide fuel passing through the filtering member, said conduit connecting member having a second cylindrical portion at one end thereof connected to the first cylindrical portion to form a concave portion at a junction of the first and second cylindrical portions so that a check valve for preventing the fuel from flowing back is retained in the concave portion,
   wherein one of said first and second cylindrical portions forms an inner cylindrical portion with radial ribs to form said concave portion, and the other of said first and second cylindrical portions forms an outer cylindrical portion covering the inner cylindrical portion, said inner and outer cylindrical portions being fixed together.

2. A strainer device according to claim 1, wherein said sucking passage member further includes a valve seat located above the concave portion.

3. A strainer device according to claim 2, further comprising a poppet valve retained in the concave portion as the check valve.

4. A strainer device to be attached to a fuel tank, comprising:
   a sucking passage member substantially located inside the fuel tank and having a passage with a hole opened in the fuel tank at one end, a first cylindrical portion at the other end thereof, and a strainer holding member,
   a filtering member attached to the sucking passage member for covering the hole of the passage, said strainer holding member maintaining the filtering member in an expanded shape,
   a conduit connecting member attached to the sucking passage member to extend outside the fuel tank for connecting a conduit to guide fuel passing through the filtering member, said conduit connecting member having a second cylindrical portion at one end thereof connected to the first cylindrical portion to form a concave portion at a junction of the first and second cylindrical portions so that a check valve for preventing the fuel from flowing back is retained in the concave portion, a socket member, to be fixed to the fuel tank, for receiving therein a base end portion of the sucking passage member, and a plug member screwed to the socket member for fixing the base end portion relative to the socket member, wherein said strainer holding member includes a flange attached to the sucking passage member, a plurality of plate shape members extending from the flange, and an opening formed in the flange to communicate with the passage.

* * * * *